United States Patent Office 2,893,790
Patented July 7, 1959

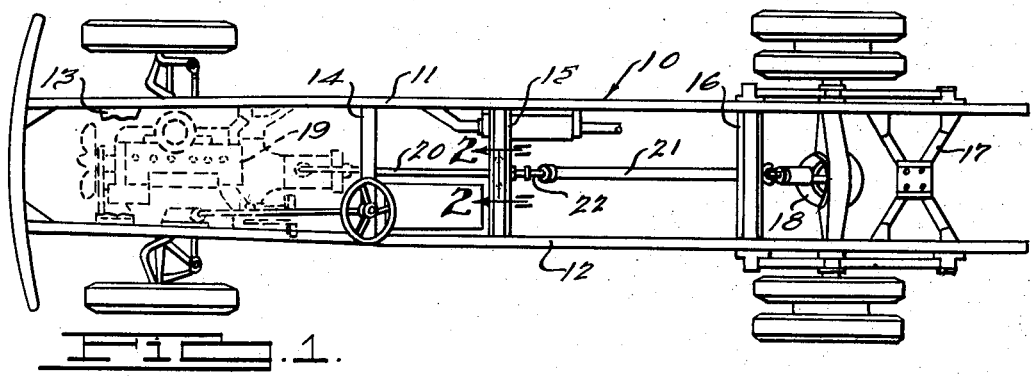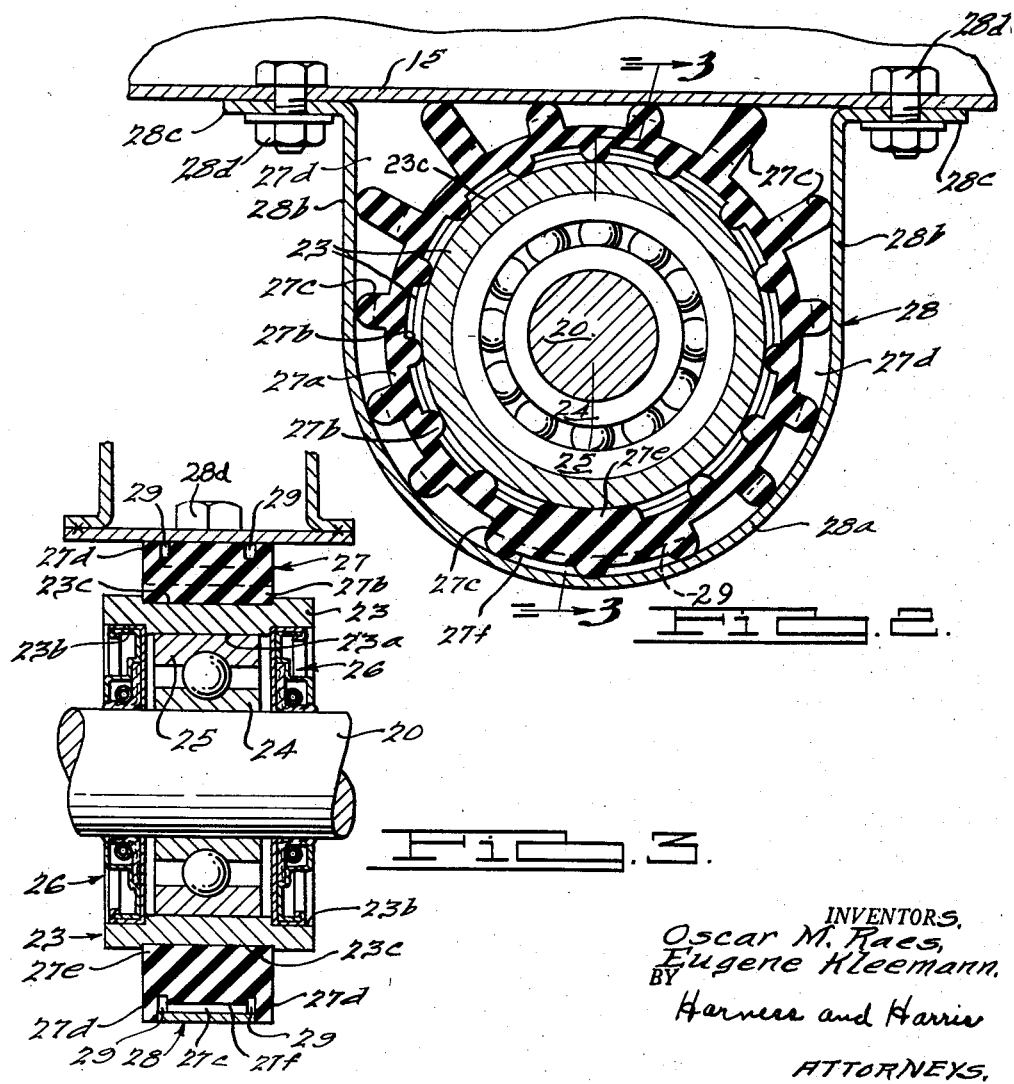

2,893,790

CENTER BEARING MOUNTING FOR VEHICLE PROPELLER SHAFT

Oscar M. Raes, Utica, and Eugene Kleemann, Fraser, Mich., assignors to Chrysler Corporation, Highland Park, Mich., a corporation of Delaware Application March 27, 1956, Serial No. 574,262

11 Claims. (Cl. 308—184)

This invention relates generally to wheeled vehicles, including trucks and buses, and more particularly to a new and improved means for mounting the vehicle propeller shaft which extends from the transmission to the differential and axle assembly. The present application relates to improvements in a resilient mounting of the type shown in our Patent No. 2,792,066, May 14, 1957.

It is common practice to provide trucks, buses, and other wheeled vehicles with a rear wheel drive and to mount the power plant and speed reduction transmission at the forward portion of the vehicle. This necessitates the use of a relatively long propeller shaft to provide a powered connection between the transmission and the differential gear means. For convenience the propeller shaft is commonly formed in two parts joined together by a suitable universal joint and slip yoke connection. The two-part propeller shaft construction reduces the distance between supports and thereby reduces the severity of forced vibrations created therein during operation. However such a construction introduces the need for an intermediate resilient support structure at the juncture of the two parts of the propeller shaft, the support structure usually being carried by a cross member of the vehicle frame.

Suitable resilient insulators are normally employed for the purpose of reducing vibration of the propeller shaft components in the vicinity of the intermediate support structure and for preventing the transfer of dynamic disturbances in the propeller shaft assembly to the vehicle frame and super structure.

A principal feature of the instant invention resides in the provision of a new and improved insulator between the center bearing structure for the propeller shaft and the portions of the supporting structure which are integrally joined to the above-mentioned frame cross member. This insulator functions as a vibration damper effective to increase its damping action as the vibrational disturbances in the propeller shaft increase. By way of contrast, conventional insulators commonly employed in similar applications have substantially constant damping characteristics and are designed to dampen the more severe vibrational disturbances which are encountered during operation. In consequence the conventional intermediate bearing structure for a two-part propeller shaft transmits a relatively large percentage of the lesser but also objectionable vibrational disturbances in the propeller shaft to the frame.

The provision of an improved propeller shaft mounting means of the type briefly mentioned above being a principal object of this invention, another object is to provide an improved mounting for the center bearing structure of a two-part vehicle propeller shaft, the mounting including a resilient shock absorbing insulator having variable damping characteristics.

Another object is to provide a new and improved mounting for a two-part propeller shaft as above described, wherein the insulator for supporting the propeller shaft center bearing structure comprises a resiliently deformable annular bushing of rubber or rubber-like material characterized by a simplified unitary or one-piece construction adapted for use with propeller shaft assemblies of known construction.

Another object is to provide a particularly simple, compact and economical mounting for a vehicle propeller shaft, which functions to substantially eliminate the transfer of vibrational disturbances from the propeller shaft to the vehicle frame and other parts of the vehicle during operation, and which effectively supports the propeller shaft closely adjacent the underside of one of the customary structural cross frame members of the vehicle, thereby to render feasible a lower vehicle frame than has been possible heretofore without recourse to recessing the cross frame member to enable passage of the propeller shaft.

For the purpose of particularly describing the instant invention, reference will be made to the accompanying drawings in which:

Figure 1 is a plan view showing the principal portions of a typical truck chassis and power train elements;

Figure 2 is a fragmentary enlarged sectional view through the insulator and bearing mounting, taken in the direction of the arrows substantially along the line 2—2 of Figure 1; and Figure 3 is a fragmentary sectional view taken in the direction of the arrows substantially along the broken line 3—3 of Figure 2.

Referring to Figure 1, the numeral 10 is used to designate generally the structural frame of a typical truck chassis comprising a pair of side rail members 11 and 12 spaced by a plurality of horizontal structural cross frame members 13, 14, 15, 16, and 17. A rear drive differential 18 is suitably mounted on the frame 10 and powered from the vehicle engine 19 by means of a two-part propeller shaft assembly comprising front and rear shafts 20 and 21 extending end-to-end generally longitudinally of the vehicle and having juxtaposed ends connected by a slip-sleeve universal coupling 22. The forward end of shaft 20 and rearward end of shaft 21 are operatively connected with the engine 19 and differential 18 respectively, whereby upon operation of the engine 22, the propeller shaft 20, 21 is rotated to drive the vehicle rear wheels through the differential 18 in accordance with customary practice.

In the present instance, the shaft 20 is supported adjacent the coupling 22 by the cross frame member 15 which extends immediately above the shaft 20 in close proximity thereto. The means for supporting the propeller shaft from the cross member 15 comprises the subject matter of this invention and is illustrated in detail in Figures 2 and 3. An annular bearing housing 23 supports a conventional bearing having inner and outer races 24 and 25 engaging respectively the shaft 20 and the cylindrical interior wall portion 23a of the housing 23. Adjacent axially opposite ends, the interior diameter of the housing 23 is enlarged at 23b to receive a pair of grease and dirt shields indicated generally by the numeral 26. By the structure described thus far, the shaft 20 extends coaxially through and is journalled in the housing 23 by means of the bearing 24, 25.

The outer surface of the housing 23 is formed with a shallow channel having a circularly cylindrical base 23c comprising a seat for an insulator or bushing 27. The latter is a unitary or one-piece molded structure of resiliently deformable and comparatively soft rubber or rubber-like material. The insulator 27 is formed to provide an annular body 27a having a width axially equal to the width of the seat 23c and adapted to extend coaxially around the latter. A plurality of uniformly and circumferentially spaced inner and outer ribs or radial projections 27b and 27c respectively integral with the body 27a extend parallel to the latter's axis.

As illustrated, each inner rib 27b is spaced equidistant circumferentially between a pair of juxtaposed outer ribs 27c, and vice versa. Also each inner rib 27b extends axially of the shaft 20 the entire width of the body 27a and is substantially a semi-circular cylinder tangentially engaging the seat 23c to support the housing 23 and contained bearing assembly and shaft 20.

The circumferential thickness of each rib 27c at its juncture with the body 27a is approximately 25% greater than the corresponding thickness of each rib 27b. The circumferentially spaced sides of each rib 27c extend parallel to the diametrical plane equidistant therebetween and terminate in an outer semi-circular cylindrical portion. The outer portions of the ribs 27c around the lower half of the insulator 27 extend to loci on a cylindrical path coaxial with the body 27a and spaced radially therefrom a distance approximately equal to the aforesaid circumferential thickness of the ribs 27c. Thus the ribs 27c seat against and are supported by the substantially semi-circular cylindical channel base 28a of a sheet steel hanger-type housing or cradle 28.

The channel base 28a extends coaxially with the shaft 20 and insulator 27 and merges upwardly in vertical side portions 28b which meet the horizontal under side of the cross frame member 15 and terminate in lateral flanges 28c secured to the member 15 by bolts 28d. The ribs 27c around the upper portion of the body 27a extend to the corresponding sides 28b or frame member 15 to provide a resilient vibration insulating support entirely around the bearing housing 23. Accordingly the insulator 27 and contained bearing assembly are housed by the hanger 28, which supports the insulator 27 laterally and from below, and by the cross frame member 15 which supports the insulator 27 from above.

The housing 28 extends axially a lesser distance than does the body 27a and is confined between a pair of lateral flanges 27d comprising integral portions of the insulator 27 extending radially from opposite sides of the body 27a. In the region of the housing 28 the flanges 27d extend radially beyond the ribs 27c to the outer periphery of the housing 28, whereas in the region of the overlying cross frame member 15, the flanges 27d extend merely to the underside of the latter member.

The space between what would otherwise be the two lowermost ribs 27b is filled by the aforesaid resiliently deformable material integral with the body 27a, thereby to provide a bottom rib 27e having a circumferential thickness equal to the corresponding thickness of two ribs 27b and the space therebetween. The rib 27e is arranged symmetrically with respect to the vertical axial plane of the body 27a and extends axially the entire width of the latter. Similarly, reinforcing portions 27f of said resilient deformable material integral with the body 27a and the bottommost and two laterally adjacent ribs 27c partially fills the spaces between these ribs to comprise in effect a bottom outer rib of appreciable greater thickness circumferentially than any of the other ribs. In consequence of the thickened bottom rib 27e and the reinforcements 27f, lateral bulging of the rib 27e and of the three lowermost ribs 27c under the weight of the shaft 20 and bearing mounting is minimized and the aforesaid weight is adequately supported by a comparatively simple bushing structure 27 molded from rubber or rubber-like material having substantially uniform hardness throughout.

In order to increase the flexibility of the ribs 27c and their effectiveness in damping the more frequent smaller vibrational impulses from the shaft 20, particularly torsional impulses tending to oscillate the bushing 27 rotatably about its axis, the semi-cylindrical outer portion of each rib 27c is notched at axially opposite ends at 29 to a depth approximately equal to its radius. Thus as illustrated in Figure 3, the ends of the semi-cylindrical portion of each rib 27c are spaced from the adjacent side flanges 27d by distances slightly less than the radius of the semi-cylindrical portion, whereas radially inwardly of the notches 29, the ends of the ribs 27c and reinforcements 27f are integral with the adjacent side flanges 27d.

The alternately spaced and oppositely directed ribs 27b and 27c cooperable with the body 27a achieve a superior variable damping characteristic wherein the resistance to forced vibrations of the propeller shaft is substantially proportional to the magnitude of the vibrations. The arrangement of the shorter less yieldable ribs 27b (as compared to the ribs 27c) in direct supporting contact with the periphery of the bearing housing 23, together with the longer more readily yieldable ribs 27c having radially outer portions of increased flexibility engaging the interior of the housing or support 28, 15, as described, results in a complex damping characteristic for both torsional and radial vibration impulses which effectively isolates the central region of the two-part propeller shaft substantially uniformly from the vehicle frame 10 throughout the entire operating speed range of the engine 19. Also in consequence of the preferred construction of the insulator 27 and the resulting damping of torsional and lateral oscillations, the simplified hanger-type housing 28 which cradles the bearing housing 23 and attaches directly to the underside of the cross frame member 15 is rendered feasible. Accordingly the propeller shaft is supported closely adjacent the underside of the frame member 15, enabling appreciable lowering of the latter without necessitating its being recessed to permit passage of the shaft 20, as has been customary heretofore.

Having thus described a preferred embodiment of our invention, we claim:

1. In an automotive vehicle having a frame and a propeller shaft, a bearing housing having said shaft extending therethrough and journaled therein, said housing having an exterior cylindrical portion coaxial with said shaft, an insulator of resilient deformable material comprising a body extending around said portion and having a plurality of circumferentially spaced alternate inner and outer ribs extending axially of said body, the inner ribs engaging said portion and spacing the latter from the body, and an outer housing fixed with respect to said frame and extending around said insulator, said outer ribs engaging the interior of said outer housing and spacing the same from said body, the axially opposite ends of said outer ribs having notches in their radially outer portions, each notch extending the full circumferential width of its rib and partially the radial depth thereof.

2. In an automotive vehicle having a horizontal cross frame member and a propeller shaft directly underlying said member, a bearing housing having said shaft journaled therein, an insulator of resilient deformable material comprising a body extending around said housing, said body having a plurality of inner projections engaging said housing in supporting relation at locations spaced around its periphery and spacing the latter from said body, a channel-shaped housing having said insulator confined therein, the sides of said channel-shaped housing extending upright and being secured to said member, said body also having a plurality of outer projections engaging juxtaposed portions of said member and channel-shaped housing in supporting relation and spacing the same from said body, said outer projections including projections of increased length extending to said member and the upper portions of the sides of said channel-shaped housing.

3. In an automotive vehicle having a horizontal cross frame member and a propeller shaft directly underlying said member, a bearing housing having said shaft journaled therein, an insulator of resilient deformable material comprising a body extending around said housing, said body having a plurality of inner projections engaging said housing in supporting relation at locations spaced around its periphery and spacing the latter from said body, a channel-shaped housing having said insulator confined therein, the sides of said channel-shaped housing extending upright and being secured to said member at locations above said shaft, said body having a plurality of outer projections engaging juxtaposed portions of said member and channel-shaped housing in supporting relation and spacing the same from said body, the axially opposite ends of said outer projections having notches in their radially outer portions, each notch extending the circumferential width of its projection and partially the radial depth thereof, and said body also having a pair of end flanges at its axially opposite ends respectively, each flange joining the adjacent axial ends of said outer projections adjacent said notches.

4. In an automotive vehicle having a horizontal cross frame member and a propeller shaft directly underlying said member, an annular bearing housing having said shaft extending coaxially therethrough and journalled therein, an insulator of resilient deformable material comprising an annular body extending coaxially around said housing, said body having a plurality of inner projections equally spaced circumferentially and engaging said housing in supporting relation and also spacing the latter from said body, a channel-shaped housing having said insulator confined therein, the lower portion of said channel-shaped housing being cylindrically coaxial with said shaft, the sides of said channel-shaped housing extending upright and being secured to said member at locations above and at opposite sides of said shaft, said body also having a plurality of outer projections equally spaced circumferentially and engaging juxtaposed portions of said member and channel-shaped housing in supporting relation and also spacing the same from said body, both the lowermost inner and the lowermost outer projection extending circumferentially a distance greater than the circumferential thickness of the other of said projections and being arranged symmetrically with respect to a vertical plane through the axis of said shaft.

5. In an automotive vehicle having a horizontal cross frame member and a propeller shaft directly underlying said member, a cylindrical bearing housing having said shaft extending coaxially therethrough and journaled therein, an insulator of resilient deformable material comprising a body extending around said housing, said body having a plurality of inner projections engaging said housing in supporting relation at locations spaced around its periphery and spacing the latter from said body, a channel-shaped housing containing said insulator and having a base portion coaxial with said shaft, the sides of said channel-shaped housing extending upright from said base portion and being secured to said member at locations above and at opposite sides of said shaft, said body also having a plurality of outer projections arranged alternately with respect to said inner projections and engaging juxtaposed portions of said member and channel-shaped housing in supporting relation and spacing the same from said body, said outer projections including projections of increased length extending to said member and the sides of said channel-shaped housing above said base portion.

6. In an automotive vehicle having a horizontal cross frame member and a propeller shaft directly underlying said member, an annular bearing housing having said shaft extending coaxially therethrough and journalled therein, an insulator of resilient deformable material comprising an annular body extending coaxially around said housing, said body having a plurality of axially extending circumferentially spaced inner projections engaging said housing in supporting relation and also spacing the latter from said body, a channel-shaped housing having said insulator confined therein, the lower portion of said channel-shaped housing being cylindrically coaxial with said shaft, the sides of said channel-shaped housing extending upright and being secured to said member, said body also having a plurality of axially extending circumferentially spaced outer projections engaging juxtaposed portions of said member and channel-shaped housing in supporting relation and also spacing the same from said body, the axially opposite ends of said outer projections having notches in their radially outer portions, each notch extending the circumferential width of its projection and partially the radial depth thereof.

7. A mounting for a generally horizontal propeller shaft of an automotive vehicle comprising a bearing housing having said shaft extending coaxially therethrough and journalled therein, an outer housing for said bearing housing and secured to said vehicle, and a vibration damping insulator for supporting said bearing housing within said outer housing comprising an annular body of resilient deformable material extending coaxially around said bearing housing and having a plurality of circumferentially spaced inner and outer radial projections of said material spacing said bearing housing and outer housing from each other, said projections including both a lowermost outer projection and a lowermost inner projection extending circumferentially a distance appreciably greater than the circumferential thickness of the other of said projections and being arranged symmetrically with respect to a vertical plane containing the axis of the coaxial body and shaft.

8. A mounting according to claim 7 wherein said projections extend parallel to said axis, the inner and outer projections spaced from said lowermost projections being arranged alternately around said body.

9. A mounting according to claim 7 wherein said projections extend parallel to the axis of said body, the outer projections being longer radially than the inner projections and being notched radially at axially opposite ends.

10. A mounting according to claim 9 wherein said body also has a pair of end flanges at its axially opposite ends respectively, each flange joining the adjacent axial ends of said outer projections adjacent said notches.

11. A vibration damping insulator for mounting a bearing housing within a comparatively fixed outer housing comprising an annular body of resilient deformable material having a plurality of circumferentially spaced inner and outer radial projections, the inner projections terminating inwardly at points equidistant from the axis of the body, each inner projection being spaced between two adjacent outer projections, the outer projections spaced around approximately one-half of the body terminating outwardly at loci on a circularly cylindrical path coaxial with said body, the outer projections spaced around the approximate other half of the insulator terminating at loci determined by three lines, one of said lines being tangential to said path at a location approximately diametrically opposite the mid region of said one half, the other two of said lines being substantially perpendicular to said one line and tangential to said path at opposite sides of said insulator.

References Cited in the file of this patent

UNITED STATES PATENTS

| | | |
|---|---|---|
| 1,483,903 | Masury | Feb. 19, 1924 |
| 2,102,415 | Herreshoff | Dec. 14, 1937 |
| 2,318,477 | Firth | May 4, 1943 |
| 2,366,860 | Kraft | Jan. 9, 1945 |
| 2,382,246 | McFarland | Aug. 14, 1945 |
| 2,674,330 | Feil | Apr. 6, 1954 |